B. M. W. HANSON.
DROP TABLE MECHANISM FOR MILLING MACHINES.
APPLICATION FILED JULY 31, 1918.
1,347,778.
Patented July 27, 1920.
3 SHEETS—SHEET 1.
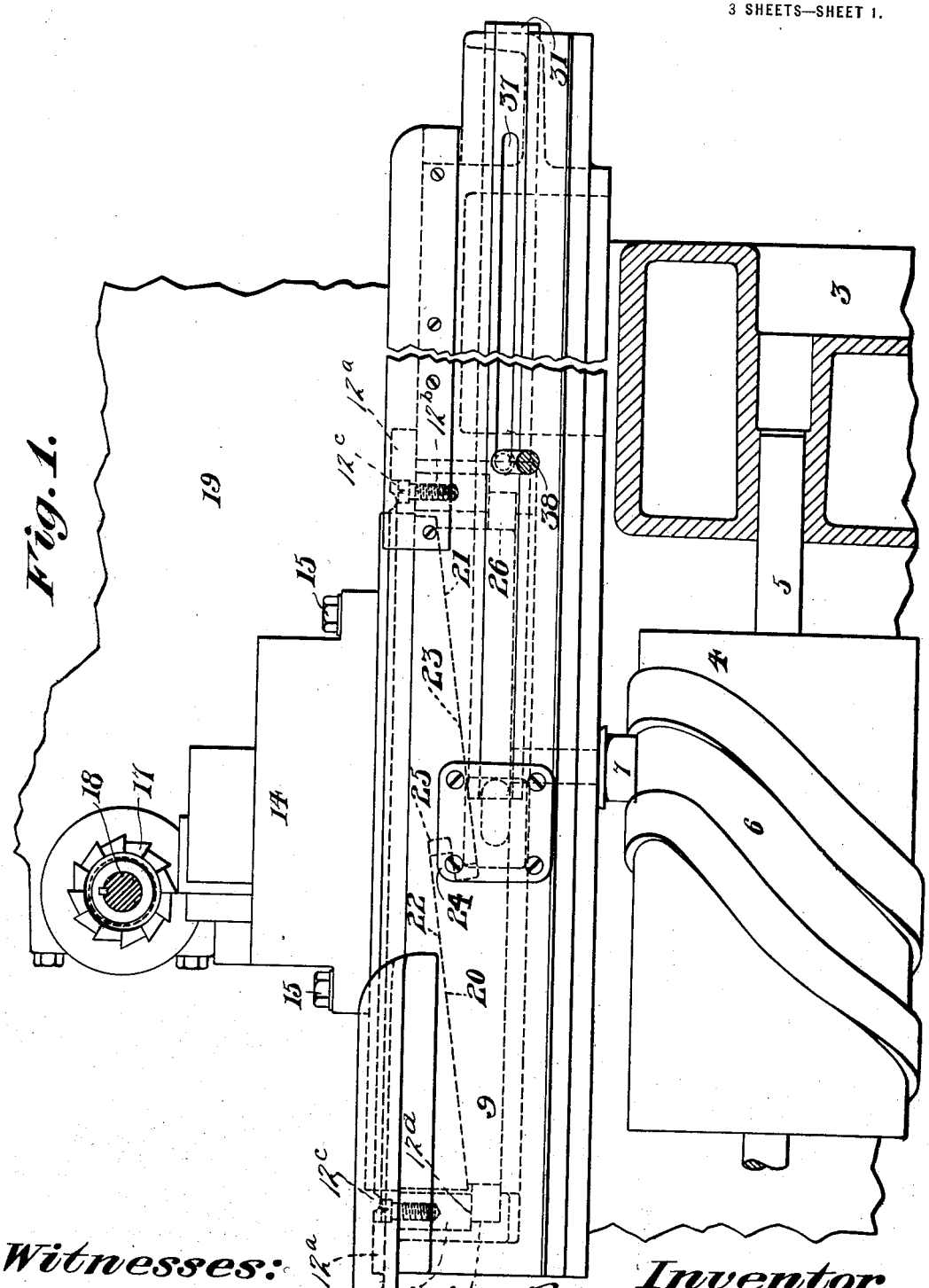

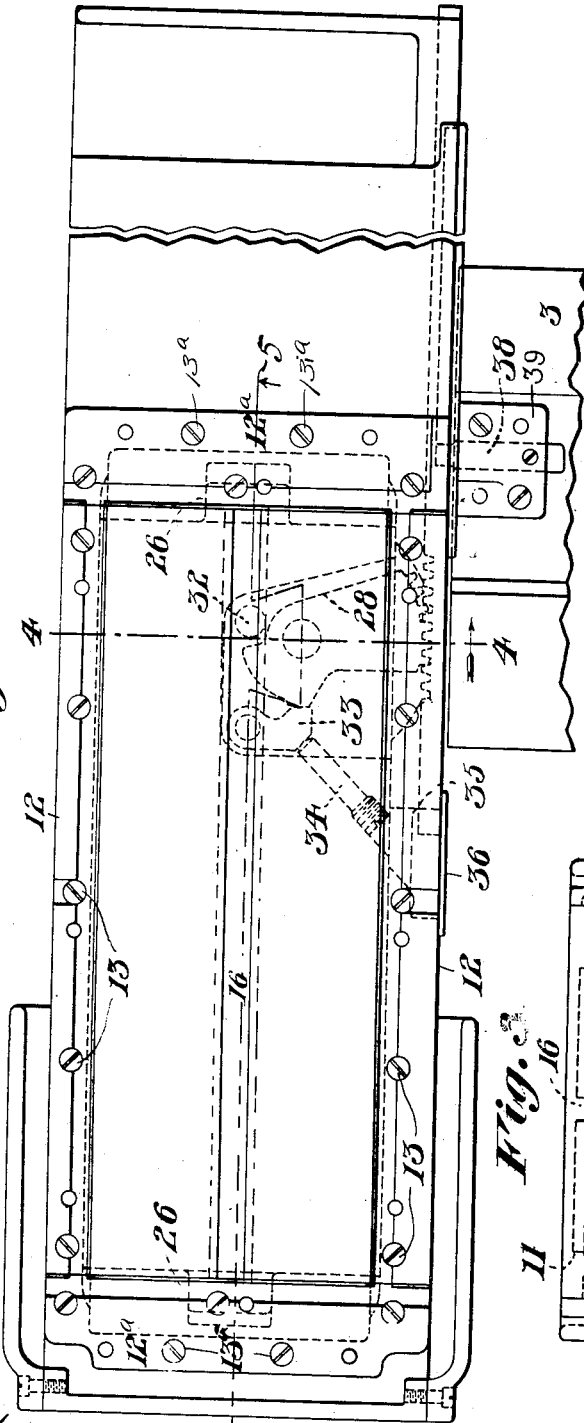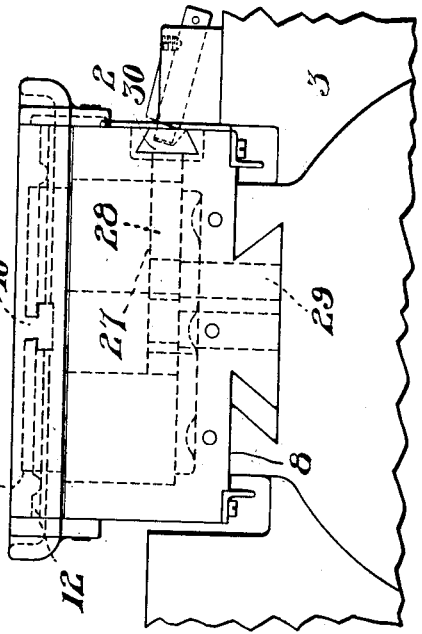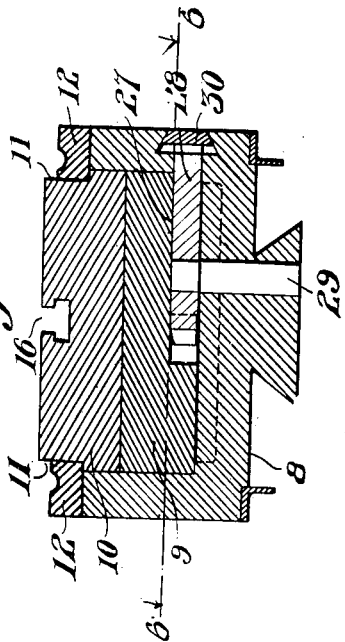

B. M. W. HANSON.
DROP TABLE MECHANISM FOR MILLING MACHINES.
APPLICATION FILED JULY 31, 1918.
1,347,778.
Patented July 27, 1920.
3 SHEETS—SHEET 3.
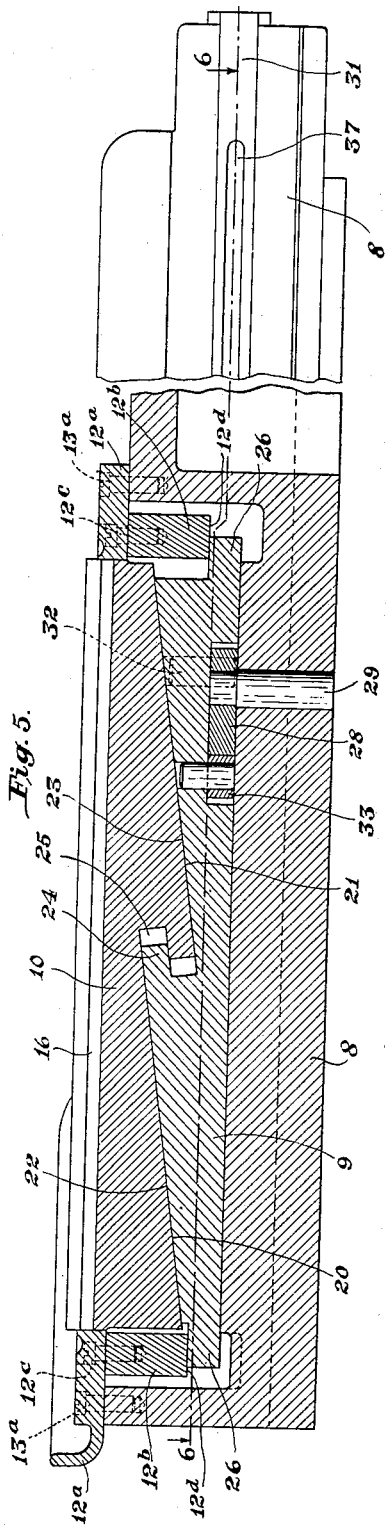
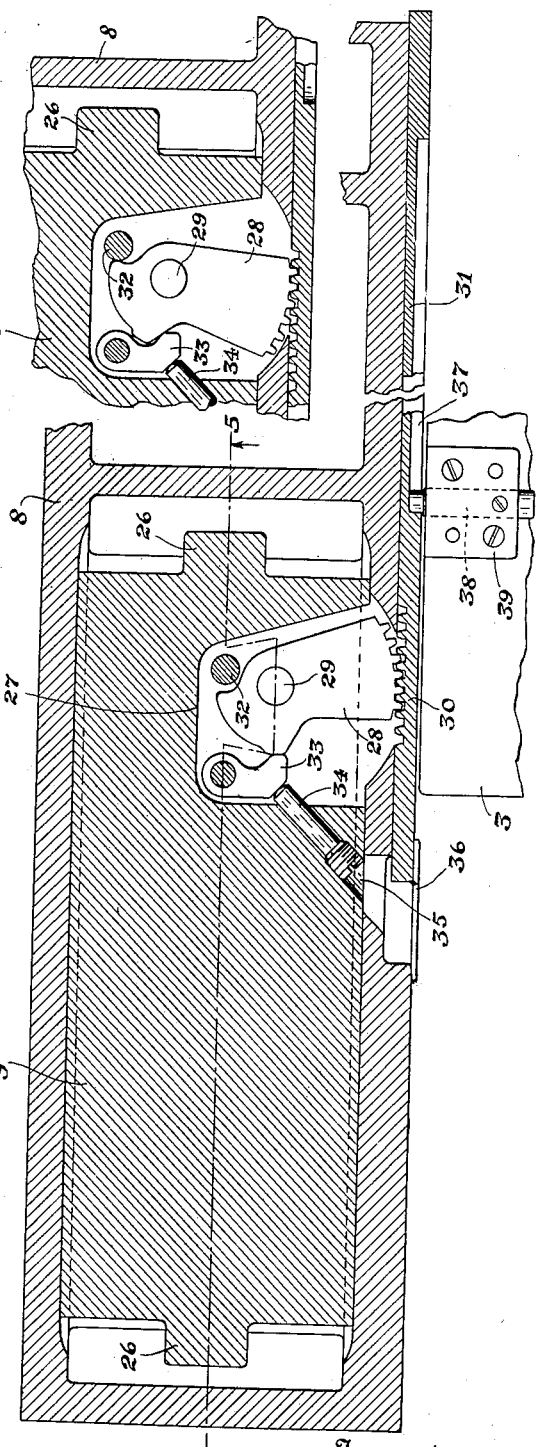
Inventor
B. M. W. Hanson.
By S Jay Teller
Attorney.

UNITED STATES PATENT OFFICE.

BENGT M. W. HANSON, OF HARTFORD, CONNECTICUT, ASSIGNOR TO PRATT & WHITNEY COMPANY, OF NEW YORK, N. Y., A CORPORATION OF NEW JERSEY.

DROP-TABLE MECHANISM FOR MILLING-MACHINES.

1,347,778.  Specification of Letters Patent.  Patented July 27, 1920.

Continuation of application Serial No. 869,216, filed October 29, 1914. This application filed July 31, 1918. Serial No. 247,638.

*To all whom it may concern:*

Be it known that I, BENGT M. W. HANSON, a citizen of the United States, residing at Hartford, in the county of Hartford and State of Connecticut, have invented certain new and useful Improvements in Drop-Table Mechanism for Milling-Machines, of which the following is a specification.

This application is a continuation of my application Serial No. 869,216, filed October 29th, 1914, which application was formally abandoned by me on August 3rd, 1918, and is a continuation in part of my application, Serial No. 865,856, filed October 9th, 1914, and which matured into Patent 1,177,569 on March 28th, 1916.

One of the objects of the present invention is to provide a mechanism of this type which is somewhat simpler in construction and which is adapted to form a permanent part of a milling machine instead of an attachment therefor as illustrated in the patent. Another object of the invention is to provide improved means for operating the slide which effects the raising and lowering of the table. Still further objects of the invention will be apparent from the following specification and claims.

In the drawings accompanying and forming part of the present specification I have shown in detail one of the several convenient forms of embodiment of the invention, which to enable those skilled in the art to practice the same will be set forth fully in the following description. I do not restrict myself to this particular disclosure; I may depart therefrom in several respects within the scope of the invention defined by the claims following said description.

Referring to said drawings:

Figure 1 is a side elevation, with part of the frame in section, of a portion of a milling machine involving my invention.

Fig. 2 is a top plan view of the work carriage and a part of the frame.

Fig. 3 is an end elevation of the work carriage as seen from the left in Fig. 2, part of the frame also appearing.

Fig. 4 is a transverse section on the line 4—4 of Fig. 2.

Fig. 5 is a longitudinal vertical section on the line 5—5 of Figs. 2 and 6, one end of the carriage being shown in elevation.

Fig. 6 is a longitudinal horizontal section on the line 6—6 of Figs. 4 and 5.

Fig. 7 is a fragmentary view similar to Fig. 6 but showing the table operating elements in a different position.

Like characters refer to like parts throughout the several figures.

In the patent to which I have referred, I have shown means whereby the work and tool of whatever nature they may be, can be relatively separated at predetermined points, and the means shown for accomplishing this purpose effects the same by the raising and lowering of the work. In the present instance I raise and lower the work and attain this function by means constituting a direct part of the work carriage, which as a matter of preference, although not a necessity, reciprocates in a straight path. In the embodiment of the invention shown in said patent, the work was raised and lowered by an attachment to be mounted upon the work carriage.

As will be inferred the work carriage may be of any desirable nature, and the carriage as shown is denoted in a general way by 2, the base or bed 3 having ways as is well-known in this art for supporting the work carriage 2 for back and forth movement. The work carriage or slide 2 may be reciprocated in any desirable manner, for instance by the cam drum 4 fastened suitably to the continuously rotative shaft 5. This shaft 5 may be rotated in any desirable manner but preferably turns always in the same direction for a reason that will be hereinafter obvious. The cam drum 4 has a peripheral cam groove 6 to receive a depending stud 7 on the work carriage or slide 2 to effect a complete reciprocation of the slide 2 on each full rotation of the cam drum 4. The groove 6 is so shaped as to reduce the speed of movement of the work carriage 2 near the conclusion of its forward movement, as more fully set forth in my said patent.

As shown more fully in Fig. 4 the slide 2 consists of a main section or body member 8 and auxiliary sections 9 and 10, the section 9 as will hereinafter more particularly appear constituting an operating member for the section 10. The main section or body 8 is of box-like form, being practically rectangular to receive within its chamber or cavity the sections 9 and 10, the side faces of which bear against the inner faces of the side walls of the body 8. The bottom wall of the box-like body or slide 8 is thin so that the operating member or means 9 in the bottom of the chamber of the slide is in immediate proximity to the ways on the bed. The length of the lower or operating section 9 is less than the distance between the end walls of the box-like body 8, by virtue of which the section 9 can be shifted within and longitudinally of said body 8. To prevent accidental displacement of the upper section 10, the latter may be rabbeted along its sides as at 11, the bottoms of the rabbets being flush with the upper surfaces of the side walls of the body 8. Fitted in these rabbets are holding strips 12 which can be fastened by screws or otherwise as at 13 to the upper edges of the side walls of said body 8, the inner portions of the strips fitting against the shoulders at the bottoms of the rabbets 11.

Preferably the slide 2 is provided with recesses at the ends of the before mentioned chamber. As shown, these recesses are formed by means of cross members 12ª, 12ª which extend across the chamber at its ends and which are secured to the side and end walls by means of screws such as shown at 13ª. Preferably, as shown, these cross members engage the work support at its ends. Each of the cross members 12ª carries a depending projection 12ᵇ which is preferably detachable, being held by a screw 12ᶜ. Each of these projections 12ᵇ is provided at its bottom with a plane horizontal surface 12ᵈ.

The work in the present case is connected suitably to a fixture as 14 which can be bolted or otherwise secured to the section 10, bolts as 15 being shown for this purpose. The carriage section 10 has a longitudinally extending slot 16 to receive the bolts, so that the fixture 14 can be firmly held in position. The tool shown is a milling tool, being denoted by 17, and being fastened to the arbor 18 connected with the usual spindle mounted upon the headstock 19.

The means by which the work carrying section 10 of the work carriage is raised and lowered is of wedge type in action, the lower or operating section 9 of the work carriage having two wedge faces 20 and 21 co-operative with similar wedge faces 22 and 23 on the upper section 10. It will be understood that if the element 9 be moved toward the left in Fig. 1, with respect to the body 8, the wedge surfaces will effect the raising of the section 10 and therefore of the work connected with the fixture 14 fastened to the section 10. On opposite movement of the member 9 with relation to the body 8, the section 10 will be lowered, and while this might be obtained solely by gravity, I prefer that more positive means, such for example as will now appear be provided for this purpose. The connecting portion of the steps of the lower section 9 is provided with a tongue 24 which enters a groove 25 in the connecting portion of the upper section 10, this tongue and its groove being inclined similarly to the wedge surfaces. The result is that when the lower section 9 is moved toward the right relatively to the body 8 in the manner set forth, the lower section will positively draw the upper section downward. The lower section 9 may be provided as shown with projections or lugs 26 at its ends. These lugs 26 enter the aforesaid recesses and each of them is provided with a horizontal plane top surface in engagement with the corresponding horizontal plane surface 12ᵈ. The lugs 26 serve to prevent upward displacement of the wedge member without interfering with the longitudinal movement thereof.

Any desirable means may be provided for reciprocating the section 9 with respect to the section 10 to effect the raising and lowering of the latter at proper times. That shown and now to be described is quite satisfactory and is in some respects similar to that shown in my said patent.

The operating section 9 between the ends thereof has a cavity or aperture 27 in its bottom under side opening into one side and in this cavity or aperture is mounted an oscillatory toothed sector 28 pivoted at 29 to the bottom of the body member 8. The teeth of the sector are in mesh with the teeth of a rack 30 set into a dove-tailed groove in the outer surface of one of the side walls of the body 8. Rigid with and extending from this rack bar and in effect forming a continuation or part thereof is a rod 31. The toe of the sector 28 acts against a pin 32 to effect the movement of the member 9 in one direction while the heel thereof acts against the adjustable bearing 33 to move the member 9 in the opposite direction. The pin 32 extends from the upper wall or roof of the cavity 27, while the adjustable bearing 33 is pivoted to the upper wall and is maintained in its adjusted position or can be adjusted by a screw 34 tapped into a bore in the part 9. Access can be had to the screw through an opening or slot 35 in the body section 8, said slot being normally covered by the plate or cap 36 held in place by screws or otherwise. The rod 31 has a longitudinally extending slot 37 to receive a stationary pin 38 which is adapted to effect the movement of the rod 31 relatively to the body member 8. This pin 38 is situated at a downward outward inclination and is carried by a bracket 39 fastened suitably to the bed or frame 3.

In Figs. 1 and 6 the slide 2 has almost completed its movement toward the right, which as will be understood, is the advancing movement. The rear end wall of the slot 37 has come against the stationary or fixed pin 38, so that on the continued forward movement of the slide 2 the rod 31 will be arrested or moved relatively to the body member 8. The consequence is that the rod or bar 31 and the rack 30 are relatively moved toward the left in Fig. 2 so as to rock the sector 28 in such manner as to cause its toe to engage the pin 32 and thereby relatively move the section 9 to the right in Figs. 1, 2, 5 and 6 and effect the lowering of the upper wedge or section 10 and hence of the work sustained thereby, the lowering of the work occurring just after or about the finishing of the milling or other operation. This action will be more clearly understood by referring to Fig. 7 wherein the sector 28 has been moved about its pivot to move the wedge 9 to the right, thereby lowering the section 10. The parts now maintain this lowered relative position during the retractive or non-cutting stroke of the slide. Just before the retractive movement of the slide 2 is completed the forward closed end of the slot 37 will strike the fixed pin 38 and reverse the operation so that through the described parts the heel of the sector 28 as the sector rocks can come against the bearing 33 and move the parts to the position shown in Fig. 6. The bearing 33 acts through the normally fixed screw 34 to move the operating member or wedge 9 to the left in Figs. 1, 2, 5 and 6 and thus elevate the upper wedge or section 10 and necessarily of the work sustained thereby, this particular action occurring as will be understood just about the time the slide 2 has completed its retractive movement and when the work on the slide has passed from under or free of the tool 17.

What I claim is:

1. In a milling machine the combination of a bed having horizontal ways, a unitary box-like reciprocating slide having a thin bottom wall directly engaging the ways on the bed and having its chamber closed on all sides and open at the top, a vertically movable horizontal work support positioned across the top of the chamber, means for reciprocating the slide, and means in the bottom of the chamber in immediate proximity to the ways for moving the work support upward or downward at predetermined points in the reciprocation of the slide.

2. In a milling machine, the combination of a reciprocating slide having a chamber open at the top and having recesses at the ends of the chamber, a vertically movable work support positioned across the top of the chamber and provided on its under side with longitudinally inclined parallel surfaces, a wedge member relatively movable longitudinally of the slide and having inclined upper surfaces respectively engaging the inclined surfaces of the work support, means for moving the wedge member longitudinally relatively to the slide in timed relation to the reciprocation of the latter to move the work support upward or downward, lugs on the ends of the wedge member projecting respectively into the said recesses, and means in the recesses engaging the lugs for preventing upward displacement of the wedge member.

3. In a milling machine, the combination of a reciprocating slide having a chamber closed on all sides and open at the top, detachable recess forming cross members at the ends of the chamber having depending projections with horizontal plane bottom surfaces, a vertically movable work support positioned across the top of the chamber between the cross members and provided on its under side with longitudinally inclined parallel surfaces, a wedge member relatively movable longitudinally of the slide and having inclined surfaces respectively engaging the inclined surfaces of the work support, means for moving the wedge member longitudinally relatively to the slide in timed relation to the reciprocation of the latter to move the work support upward or downward, and lugs on the ends of the wedge member projecting respectively into the said recesses and having horizontal plane top surfaces respectively engaging the bottom surfaces of the said projections and preventing upward displacement of the wedge member.

4. The combination of a reciprocating slide having a chamber open at the top, a vertically movable work support positioned across the top of the chamber and provided on its under side with longitudinally inclined parallel surfaces, the work support being also provided on its under side with a transverse groove having a plane bottom wall inclined in parallelism with the said surfaces, a wedge member relatively movable longitudinally of the body and having inclined surfaces respectively engaging the first said surfaces and supporting the work support, the wedge member also having a transverse tongue which projects into the said groove and which has a plane bottom surface inclined to engage the bottom wall of the groove, and means for moving the wedge member longitudinally relatively to the slide in timed relation to the reciprocation of the latter whereby the first said surfaces serve to move the work support upward and whereby the surface on the tongue serves to move the work support downward.

5. In a milling machine, the combination of a reciprocating slide having a chamber open at the top, a vertically movable work support positioned across the top of the chamber, means for moving the work support upward or downward, the said means including a longitudinally grooved bar slidably mounted in the slide, and means fixed against movement with the slide and projecting into the groove in the bar to engage the end walls thereof and thus effect vertical movement of the work support as the slide reciprocates.

6. In a milling machine, the combination of a reciprocating slide having a chamber open at the top, a vertically movable work support positioned across the top of the chamber, means for moving the work support upward or downward, the said means including a longitudinally grooved bar slidably mounted in and flush with the slide, and means fixed against movement with the slide and projecting into the groove in the bar to engage the end walls thereof and thus effect vertical movement of the work support as the slide reciprocates.

7. In a milling machine, the combination of a reciprocating slide having a chamber open at the top, a vertically movable work support positioned across the top of the chamber, means for moving the work support upward or downward, the said means including a longitudinally grooved bar slidably mounted in a groove in the side of the slide and engaging another element of the said means projecting into the groove, and means fixed against movement with the slide and projecting into the groove in the bar to engage the end walls thereof and thus effect vertical movement of the work support as the slide reciprocates.

In testimony whereof I hereto affix my signature.

BENGT M. W. HANSON.